United States Patent
Gilbert

(10) Patent No.: US 8,013,858 B2
(45) Date of Patent: Sep. 6, 2011

(54) STATISTICAL WAVEFORM DRAWING ROUTINE

(75) Inventor: Harry M. Gilbert, Portage, MI (US)

(73) Assignee: SPX Corporation, Charlotte, NC (US)

( * ) Notice: Subject to any disclaimer, the term of this patent is extended or adjusted under 35 U.S.C. 154(b) by 856 days.

(21) Appl. No.: 11/858,660

(22) Filed: Sep. 20, 2007

(65) Prior Publication Data

US 2009/0079741 A1 Mar. 26, 2009

(51) Int. Cl.
*G06T 11/20* (2006.01)

(52) U.S. Cl. .................................................... 345/440

(58) Field of Classification Search ............... 345/440
See application file for complete search history.

(56) References Cited

U.S. PATENT DOCUMENTS

| | | | | |
|---|---|---|---|---|
| 4,816,813 A * | 3/1989 | Furno et al. | ............ | 345/440.1 |
| 5,264,840 A * | 11/1993 | Wells et al. | ............ | 345/599 |
| 5,371,515 A * | 12/1994 | Wells et al. | ............ | 345/596 |
| 5,461,318 A * | 10/1995 | Borchert et al. | ............ | 324/533 |
| 5,764,201 A * | 6/1998 | Ranganathan | ............ | 345/3.3 |
| 7,079,143 B2 * | 7/2006 | Gilbert | ............ | 345/441 |
| 7,216,046 B2 * | 5/2007 | Agoston et al. | ............ | 702/70 |
| 7,327,879 B2 * | 2/2008 | Nako et al. | ............ | 382/167 |
| 7,528,844 B2 * | 5/2009 | Deschamp | ............ | 345/606 |
| 7,529,432 B2 * | 5/2009 | Fujishiro et al. | ............ | 382/300 |
| 2002/0180734 A1 * | 12/2002 | Endoh et al. | ............ | 345/428 |
| 2003/0132943 A1 * | 7/2003 | Guleryuz et al. | ............ | 345/581 |
| 2004/0080511 A1 * | 4/2004 | Gilbert | ............ | 345/441 |
| 2004/0186673 A1 * | 9/2004 | Agoston et al. | ............ | 702/70 |
| 2005/0144540 A1 * | 6/2005 | Fujishiro et al. | ............ | 714/48 |
| 2005/0264693 A1 * | 12/2005 | Kondo et al. | ............ | 348/458 |
| 2006/0182364 A1 * | 8/2006 | John | ............ | 382/260 |
| 2006/0188148 A1 * | 8/2006 | Nako et al. | ............ | 382/162 |
| 2006/0274207 A1 * | 12/2006 | Hayden et al. | ............ | 348/572 |
| 2007/0103486 A1 * | 5/2007 | Deschamp | ............ | 345/606 |
| 2007/0140567 A1 * | 6/2007 | Topper | ............ | 382/225 |
| 2007/0230816 A1 * | 10/2007 | Usui | ............ | 382/264 |
| 2007/0269137 A1 * | 11/2007 | Ida et al. | ............ | 382/299 |
| 2008/0130978 A1 * | 6/2008 | Neemuchwala et al. | ............ | 382/132 |
| 2008/0131024 A1 * | 6/2008 | Riley et al. | ............ | 382/284 |
| 2008/0137903 A1 * | 6/2008 | Nakamura et al. | ............ | 382/100 |
| 2009/0002398 A1 * | 1/2009 | Goerzen | ............ | 345/660 |
| 2009/0079741 A1 * | 3/2009 | Gilbert | ............ | 345/441 |
| 2009/0153560 A1 * | 6/2009 | Gilbert | ............ | 345/441 |
| 2009/0169075 A1 * | 7/2009 | Ishida et al. | ............ | 382/128 |
| 2010/0021058 A1 * | 1/2010 | Beikirch et al. | ............ | 382/173 |

* cited by examiner

*Primary Examiner* — Javid A Amini
(74) *Attorney, Agent, or Firm* — Baker & Hostetler LLP

(57) ABSTRACT

A statistical waveform drawing routine includes forming an image, determining discrete points of the image, forming count totals of the number of discrete points of the image in a sweep of the discrete points in a first direction, and determining a statistical value according to the count totals of the discrete points.

20 Claims, 6 Drawing Sheets

STATISTICAL WAVEFORM DRAWING ROUTINE

FIELD OF THE INVENTION

The invention relates generally to a drawing routine. More particularly, the invention relates to a system and technique for implementation of a statistical waveform analysis.

BACKGROUND OF THE INVENTION

Digital waveform drawing is a technique that is utilized to display data, for example measurements related to the performance of a system, over a period of time. The technique involves digitally plotting pixels, which correspond to the data, in a waveform on a screen of a display.

It is often desirable to continuously display data received over several periods of time. However, the screen of the display is limited in size and after a waveform has been displayed for a certain period of time, the waveform has to be replaced to reflect the data received from a subsequent period of time.

Software programs are utilized to determine which pixels should be digitally plotted, such that the data appears on the screen of a display as part of a continuous waveform. A wide variety of software can be used to determine the pixels.

A waveform drawing system and method is shown by Harry M. Gilbert for a Waveform Drawing System and Method, U.S. Pat. No. 7,079,143, and is incorporated herein by reference. The technique for image drawing avoided redundant plotting of pixels when replacing an existing image, for example, a waveform, with a new waveform.

The analysis of a waveform has been difficult in the past, in that a large amount of data has to be checked in order to analyze the information of the waveform. Such analysis is labor intensive and requires a large amount of time and processing power. For example, analyzing vehicle waveforms that are captured digitally often requires complex passes of the array of digital values to determine the location of certain values of the waveforms. For example, determining the location of the average value of the waveform or portions of the waveform, as well as the location of the peak and lowest point of the waveform, and significant regions of the waveform requires the complex passes of the array of digital values. Such extensive techniques are not efficient and therefore time is wasted and labor costs are increased with the time delay. A faster processor can be used, but then there is an increased demand of power and potential increase in required cache memory. Additionally, the increased load upon the device, may also increase the size and cost of the device itself, that performs the analysis.

Further, the current analysis of waveforms is limited to only certain specific types of waveforms. Such a limitation is very restrictive and can give incorrect results if applied on certain type of data.

Further, efficient waveform analysis is important when time is critical. For example, in the automotive industry there can be a restriction on the time available to analyze a waveform. The current methods are difficult to implement for rapid and real-time or almost real-time analysis of the data provided, given the amount of work in a garage.

There is a need to have an efficient technique for analyzing waveforms that is both accurate and easy to implement. Furthermore, there is a need that such analysis can be used for a wide variety of implementations.

SUMMARY OF THE INVENTION

The foregoing needs are met, to a great extent, by the invention, wherein in one aspect, an apparatus is provided that in some embodiments provides for an efficient statistical technique for waveform analysis that can be used in a plurality of implementations.

In accordance with one embodiment of the invention, a statistical waveform drawing routine includes forming an image, determining discrete points of the image, forming count totals of the number of discrete points of the image in a sweep of the discrete points in a first direction, and determining a statistical value according to the count totals of the discrete points.

The method can include an image being a waveform. Each vertical position of a graph of the image can have a count total. The sweep in the first direction can be made in the horizontal direction and the count total being along a graph of the image in the vertical direction. The statistical value can include a first value according to the number of count totals above and below a maximum value of the waveform, and summarizing the count-totals to determine a second value. A second direction can be a vertical column having the count totals for each row of data points of the waveform. A determination can be made of a product of the count-totals for each vertical position of the image by the value of vertical position of the image, where at one end of the vertical position being a first value and the other end of the vertical position being a second value. The product can be a total energy of the image. A computer-readable medium can have computer-executable instructions for performing the technique of the invention.

In accordance with another aspect of the invention, a system includes a means forming an image, a means for determining discrete points of the image, a means for forming count totals of the number of discrete points of the image in a sweep of the discrete points in a first direction, and a means for determining a statistical value according to the count totals of the discrete points.

The system can include an image being a waveform. Each vertical position of a graph of the image can have a count total in the system. The sweep in the first direction can be in the horizontal direction and the count total being along a graph of the image in the vertical direction in the system. The statistical value can include a first value according to the number of count totals above and below a maximum value of the waveform, and summarizing the count-totals to determine a second value. A second direction can be a vertical column having the count totals for each row of data points of the waveform. A determination can be made of a product of the count-totals for each vertical position of the image by the value of vertical position of the image, where at one end of the vertical position being a first value and the other end of the vertical position being a second value. The product can be a total energy of the image. A computer-readable medium can have computer-executable instructions for performing the technique of the invention.

In another aspect of the invention, a system includes a display for forming an image of a waveform, a memory including computer executable instructions for forming the waveform and analyzing the waveform, a processor connected to the memory for instructing the determination of discrete points of the waveform on the display, forming count totals of the number of discrete points of the waveform in a sweep of the discrete points in a first direction, and determining a value for the analysis of the waveform according to the count totals of the discrete points.

The system can also include a sweep in the first direction being in the horizontal direction and the count total being along a display of the waveform in the vertical direction. The system can also include the value comprising a first value according to the number of count totals above and below a maximum value of the waveform, and a second value of sum of the count-totals.

The system can also include a second direction being a vertical column having the count totals for each row of data points of the waveform. The system can further include determining a product of the count-totals for each vertical position of the waveform by the value of vertical position of the waveform, where at one end of the vertical position being a first value and the other end of the vertical position being a second value.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form, the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

Accordingly, it would be desirable to provide a technique of waveform drawing and analysis that can avoid a significant number of complex logical and arithmetic operations.

DETAILED DESCRIPTION

Figure 1:
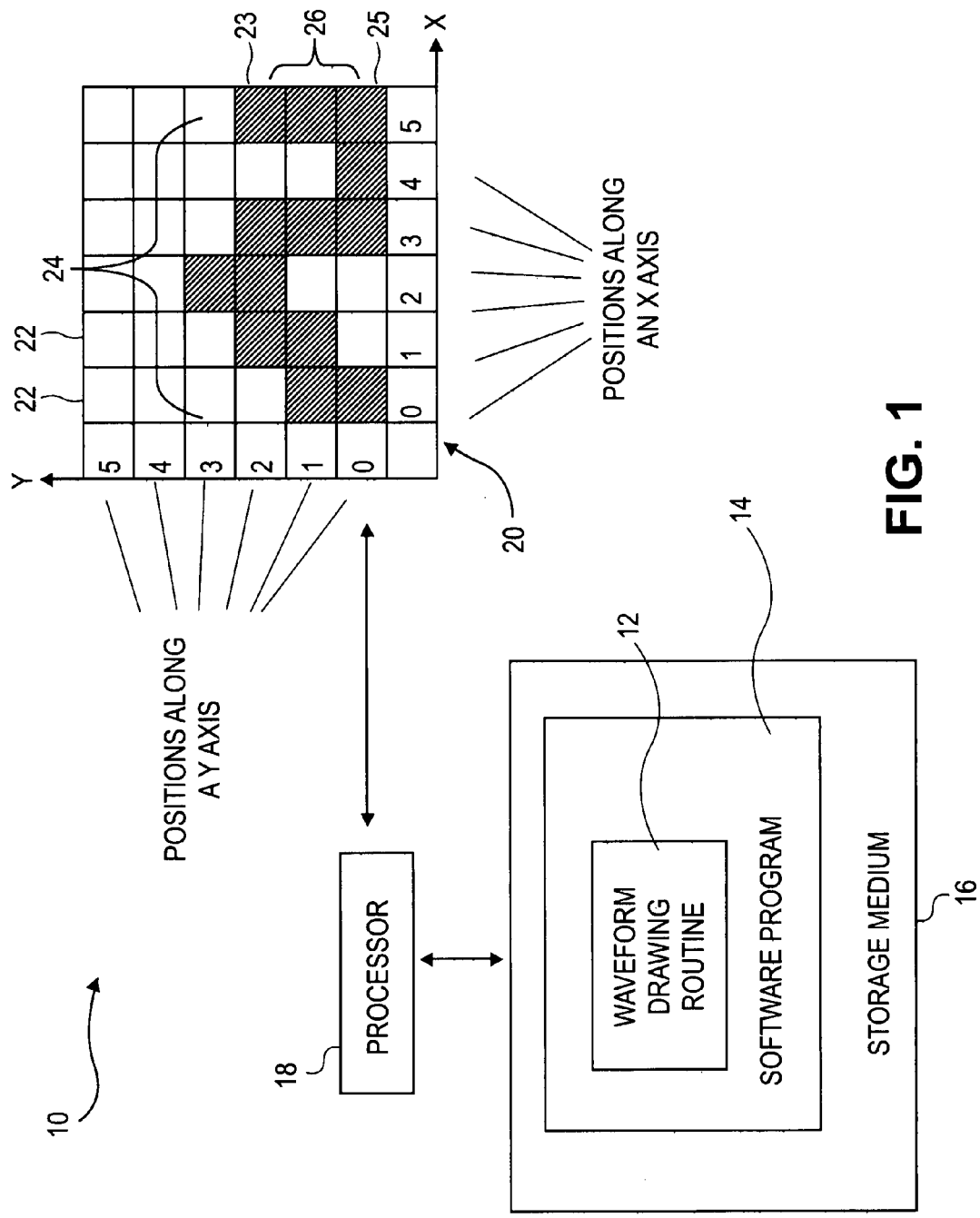
FIG. 1 is a block diagram of a system for waveform drawing in accordance with the invention.

The invention will now be described with reference to the drawing figures, in which like reference numerals refer to like parts throughout. An embodiment in accordance with the invention provides a more efficient technique of analyzing images such as waveforms, thus reducing the necessary processing that is needed.

Referring to FIG. 1, there is shown a system for drawing a waveform. The system 10 includes a waveform drawing routine 12, which can be a part of a larger software program 14, a storage medium 16, a processor 18, and a display 20. The software program may be stored on a storage medium 16 that is, for example, a diskette, a hard disk drive, a compact disc (CD), DVD (digital versatile disc or digital video disc), flash drive, a random access memory device and/or a read-only memory device.

The display 20 includes a grid of pixels 22 where a waveform 24 may be displayed. The waveform 24 is the result of a series of lines that have been plotted, such as line 26. Each line has a high end point and a low end point, and is located at a position along an axis. For example, the high end point of line 26, which corresponds to element 23, is a position two on the Y-axis and the low end point which corresponds to element 25 is zero position as seen in the Y-axis, and line 26 is drawn at position five on the X-axis. Together, the sum of all the lines, shown on the display in FIG. 1, which are at positions zero through five along the X-axis, form the resultant waveform 24.

Analyzing waveforms such as vehicle waveforms that are captured digitally often requires complex passes of the array of digital values to determine the location of the average value of the waveform or portions of the waveform, as well as the location of the peak and lowest point of the waveform, and significant regions of the waveform.

The complex passes of the array of digital values cause the use of a large amount of resources, including the need of increased processing power and increased memory. If the processor is too slow or has too little memory to use, the analysis of the waveform is slowed. The slower analysis can cause increased delay in getting the results for the user or even a sluggish performance to inhibit the use of the analysis. Therefore, if an application is time sensitive in its analysis, such increased load will have an adverse effect on the performance of a device.

For each possible vertical position of the individual point in a digital waveform, a data cell is maintained which receives a count of the number of points that were encountered at that position during a horizontal sweep of the waveform array. This array of all vertical positions can then be analyzed to determine the peak, the lowest point, the average, and other significant values related to the waveform. Additionally, since the location of the cell in the array of vertical positions corresponds to the value of the waveform at the vertical position, simple mathematics over the vertical array can be performed to yield totals, for example, total energy, represented by the waveform.

The invention requires less processing than conventional methods of waveform analysis. The reduced processing equates to less programming and greater efficiency especially for embedded devices including special purpose computing systems. The reduced processing also provides for a lower load on the processor, thereby allowing a system to have a processor with less power, thus accommodating also a reduction in the power consumption. The reduced power consumption is especially helpful in embedded devices that have a limited power supply such as a secondary battery or other portable power supply.

Figure 2:
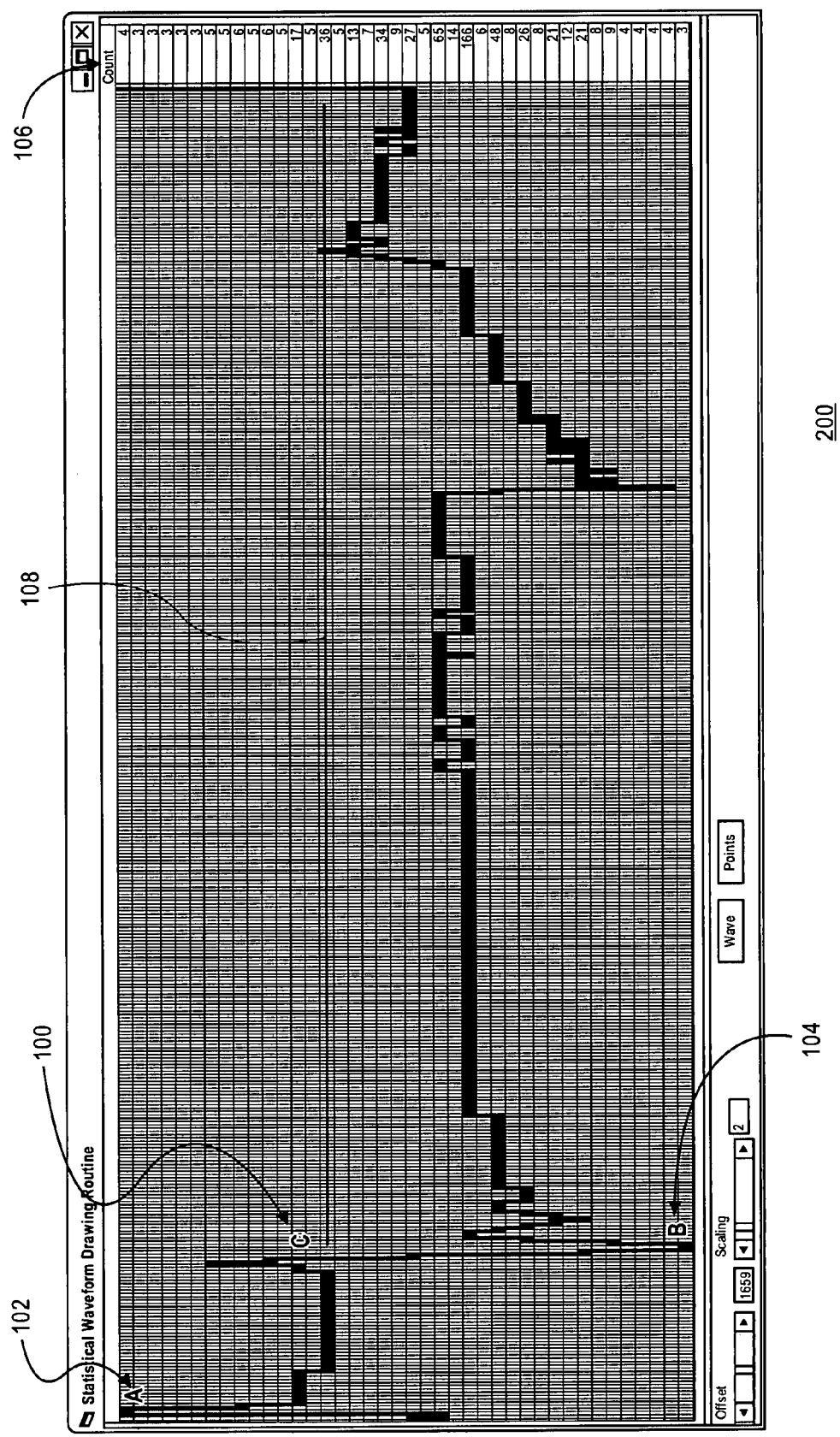
FIG. 2 illustrates a waveform showing the technique for waveform analysis of the invention.

Referring to FIG. 2, a "secondary ignition" firing waveform is illustrated as an example of the statistical method for waveform analysis. Analyzing these waveforms is an operation in real-time automotive diagnostics.

The secondary power firing waveforms are processed to find secondary ignition information as well as being displayed on a display of a testing device 200. The ignition data and the waveforms of the ignition can aid in diagnosing engine problems.

Finding the firing line and its length are performed during waveform analysis. A certain technique scans the array of values that arrives from the vehicle looking for the peak and the coil oscillations by judging the rapid change in slope from one measurement to the next. The firing line is then found between these two statistical points of the peak and the rapid change in slope.

Referring to FIG. 2, a "secondary ignition pattern" is illustrated from a single firing of a single cylinder of a vehicle. Reference A shows the spike of the voltage 102 required to start a spark across the spark plug electrodes. Reference B illustrates the end 104 of the spark plug firing and the beginning of coil oscillations. Between references A and B, is the firing line, which is the duration of the fuel combustion from the spark, which offers an important measurement for the health of a vehicle ignition system.

The technique of the invention uses the counting of every value in the waveform at its respective vertical position in the graph (representing kilovolts in FIG. 2 for example) to summarize the electrical activity across the waveform. Each vertical position in the graph has a count-total 106 as seen in the vertical column. The count total includes for each horizontal column, the total number of data points that are in the waveform. Therefore, as a horizontal sweep is made, the total number of data points in the first row is seen to be 4 and then 3 from the top of the column showing the count-total 106. The maximum 108, denoted by the line C, shows the center of the firing line energy. In the analysis, a number of count-totals 106 above and below this maximum 108 will be included, based on industry standards for firing line variation. Summarizing these count-totals will yield the length of the firing line.

Figure 3:
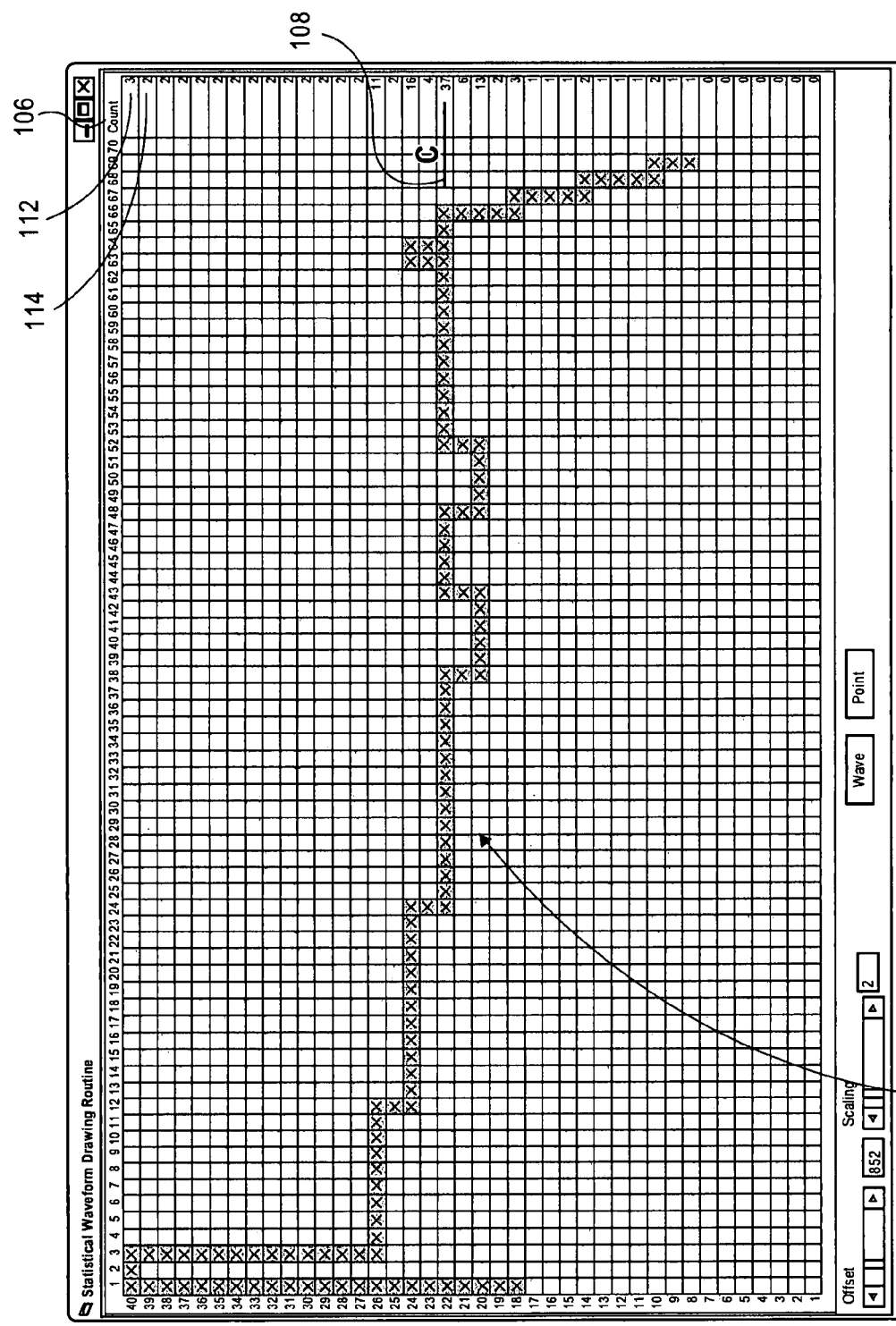
FIG. 3 illustrates a close up view of the firing line shown in FIG. 2.

FIG. 3 shows a close up of the firing line 100 itself, with its associated count-totals 106. As seen on the right side column of FIG. 3, the vertical column shows the count for each row of data points in the close-up itself. For example, at the top row 112, 3 data points are counted for the number of pixels in the waveform during a horizontal sweep of the waveform. In the second row 114, two data points are counted and shown in the column with the list of counts 106.

Figure 4:
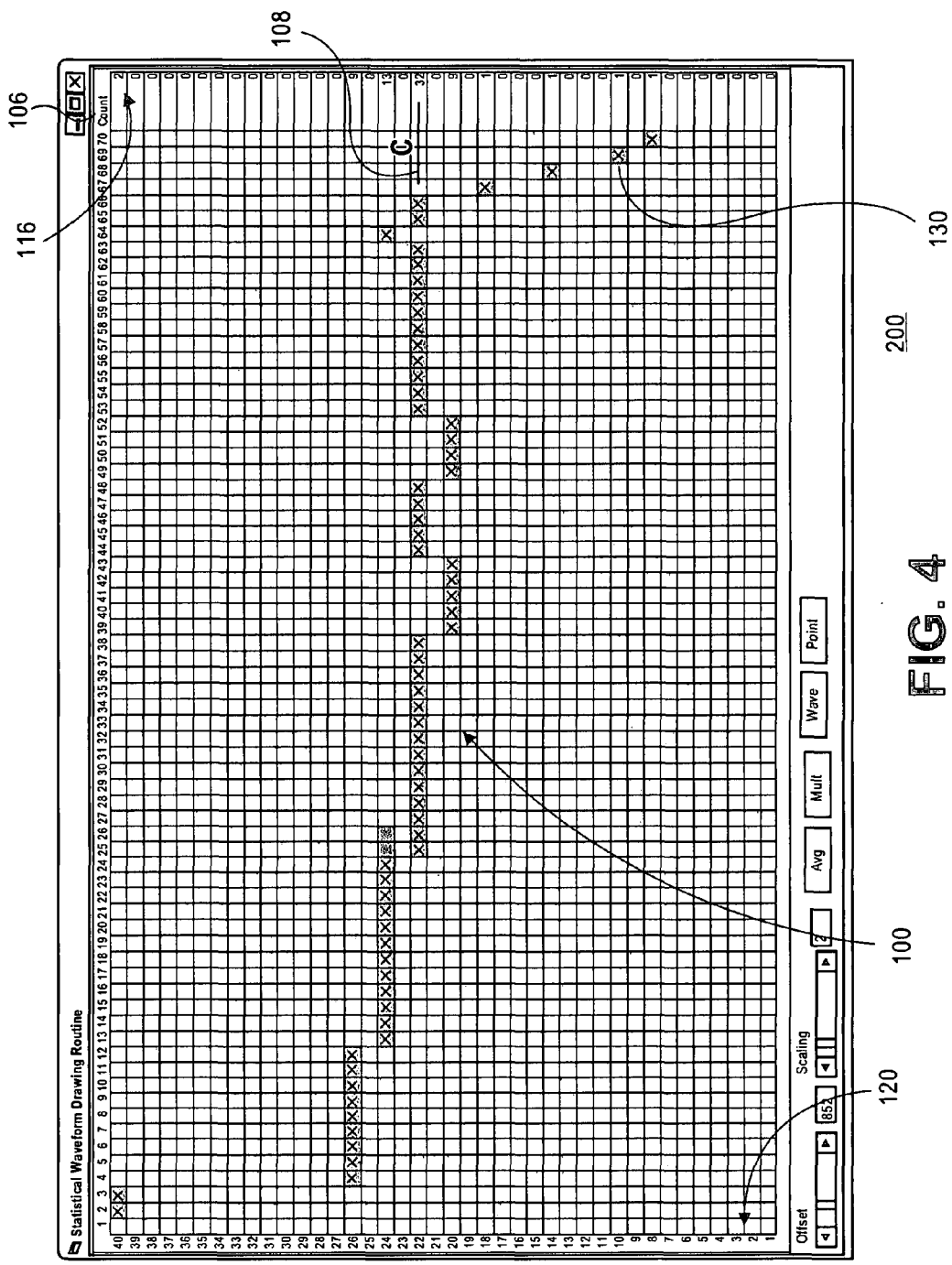
FIG. 4 is the waveform with separate points.

Referring to FIG. 4, the firing line 100 is shown with separate points 130. The firing line 100 is illustrated without the connect-the-dots logic as shown in FIGS. 2 and 3. In other words, these are the discrete values from the original digital array from the vehicle. Statistics from these points-only analyses yield somewhat different count-totals 106 from those which have been connected in FIG. 3, for example. The value of the discrete values of FIG. 4 is to represent the individual sampled values. The connected dots as seen in FIG. 3, show a better representation of the analog nature of the wave.

Figure 5:
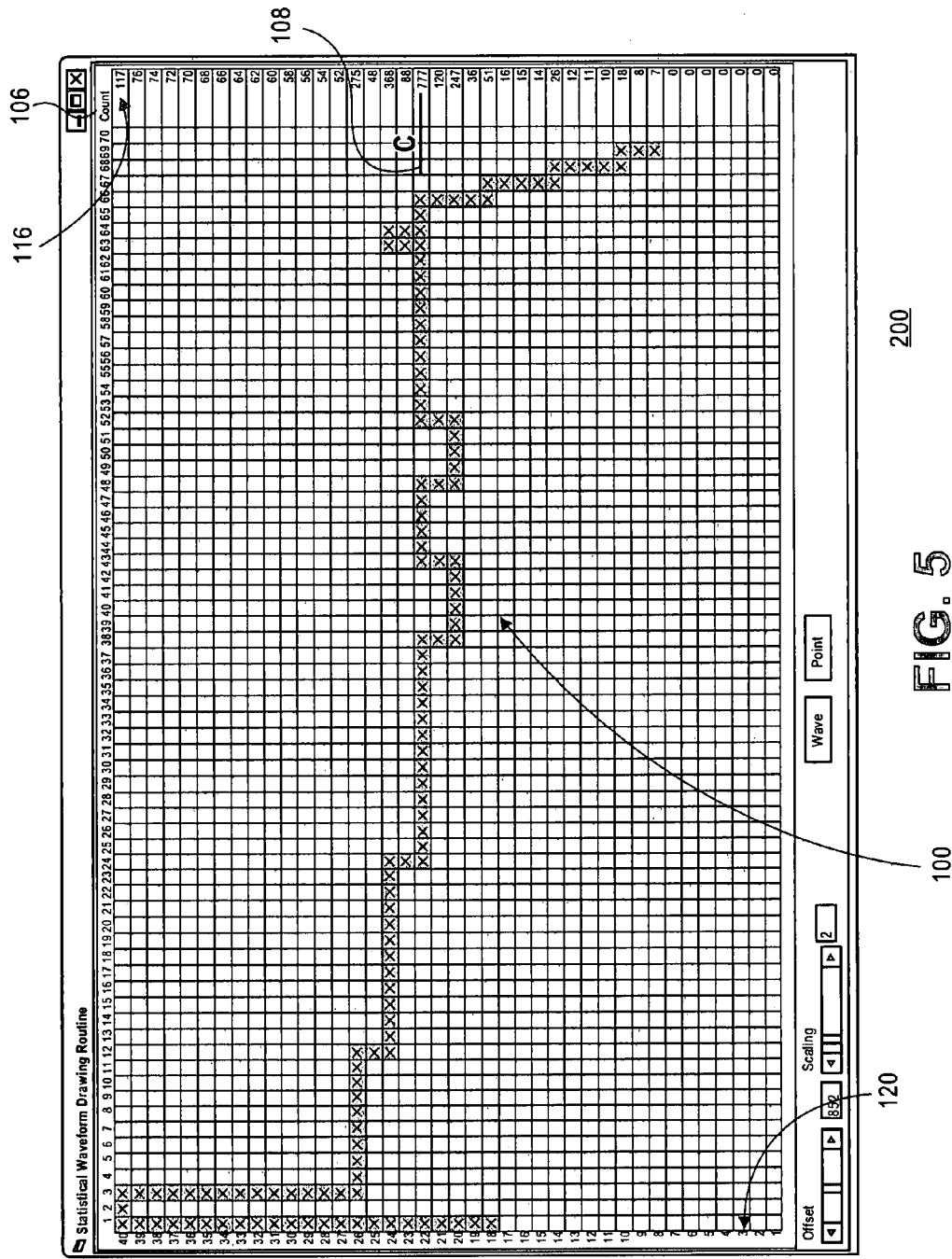
FIG. 5 illustrates the energy of the waveform in an embodiment of the invention.

FIG. 5 illustrates the firing line energy. Referring to FIG. 5, there is a multiplying of the count-total 106 for each vertical position in the graph by its, KV (kilovolt, kV) value. Therefore, the energy expenditure for the waveform can be easily calculated. FIG. 5 shows the count-total 106 multiplied by its vertical position 120 from the bottom as an example. The entire count-total column 106 can be summed to give a calculation of the total energy represented. Therefore, if the count-total for each vertical position is "a" and the vertical position from the bottom is "b", the total number of vertical positions "n" is m, then the total energy $E_{tot}$ would be:

$$E_{tot} = \sum_{n=1}^{n=m} a_n b_n$$

Referring to FIG. 5, the left hand side of the graph includes a display of the vertical position from 1 to 40 in column 120, while on the right side, the graph includes the energy count for each horizontal sweep of the waveform. For example, as seen in the position 7, a horizontal sweep shows one data point in the graph. Therefore, the energy would be 7 as seen column 106. Then, at position 9, the energy is 18 since there are two data points (2 data points×9 position=18 for the energy). Further, as seen in position 39, there are 3 data points in the horizontal sweep area, thus giving an energy of 117. The energy for position 40 would be zero as there are no data points, but the energy for position 40 is not shown in the display of FIG. 5.

Referring to FIGS. 2-5, within these waveforms, roughly the lower quarter or so of the graph represents negative energy, which would be accounted for in the calculations.

The waveform shown above is an example. However, any type of image can be analyzed. Another example would be an image that is checked for a variety of statistical measurements of the image.

Therefore, for each possible vertical position of the individual point in an image, a data cell is maintained which receives a count of the number of points that were encountered at that position during a horizontal sweep of the waveform array. The scanning of the number of points does not have to be a scan of the waveform array and the scan does not have to be a horizontal sweep necessarily, but can be a sweep of another direction.

This array of all vertical positions can then be analyzed to determine the peak, the lowest point, the average, and other significant values related to the waveform. Additionally, since the location of the cell in the array of vertical positions corresponds to the value of the waveform at the vertical position, simple mathematics over the vertical array can be performed to yield totals, for example total energy, represented by the waveform. The simple mathematics, therefore, takes the implementation easier and reduces the needed processing of the information.

The invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The invention can include the computer-readable medium having stored thereon a data structure including a plurality of fields containing data representing the techniques of the invention.

Figure 6:
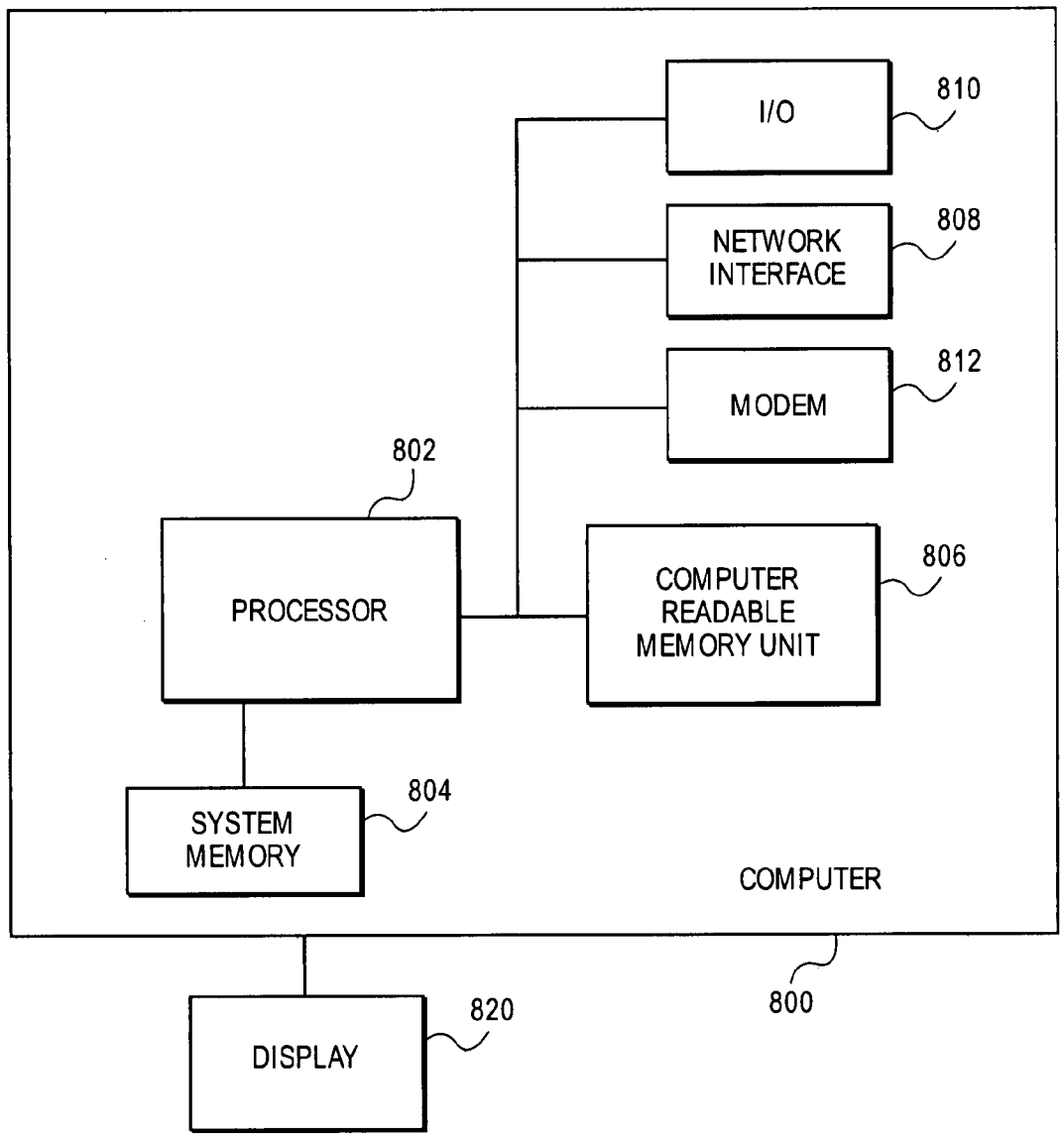
FIG. 6 illustrates an exemplary computer with a computer-readable carrier.

Referring to FIG. 6, an example of a computer, but not limited to this example of the computer 800, that can read computer readable media that includes computer-executable instructions of the invention. The computer 800 includes a processor 802 that uses the system memory 804 and a computer readable memory device 806 that includes certain computer readable recording media. A system bus connects the processor 802 to a network interface 808, modem 812 or other interface that accommodates a connection to another computer or network such as the Internet. The system bus may also include an input and output (I/O) interface 810 that accommodate connection to a variety of other devices. Furthermore, the computer 800 can output through, for example, the I/O 810, data for display on a display device 820.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method, comprising:
    forming an image on a display via a software stored on a memory and executed by a processor, wherein the image is a waveform;
    determining discrete points of the image via the processor;
    forming count totals of the number of discrete points of the image in a sweep of the discrete points in a first direction via the processor; and
    determining a statistical value according to the count totals of the discrete points via the processor, wherein the statistical value includes a first value according to the number of count totals above and below a maximum value of the waveform, and summarizing the count-totals to determine a second value.

2. The method of claim 1, wherein each vertical position of a graph of the image having a count total.

3. The method of claim 1, wherein the sweep in the first direction being in a horizontal direction and the count total being along a graph of the image in a vertical direction.

4. The method of claim 1, further comprised of a second direction being a vertical column having the count totals for each row of data points of the waveform.

5. A method, comprising:
    forming an image on a display via a software stored on a memory and executed by a processor;
    determining discrete points of the image via the processor;
    forming count totals of the number of discrete points of the image in a sweep of the discrete points in a first direction via the processor;
    determining a statistical value according to the count totals of the discrete points via the processor; and
    determining a product of the count-totals for each vertical position of the image by the value of vertical position of the image, where at one end of the vertical position being a first value and the other end of the vertical position being a second value.

6. The method of claim 5, wherein the product being a total energy of the image.

7. The method of claim 5, wherein each vertical position of a graph of the image having a count total.

8. The method of claim 5, wherein the sweep in the first direction being in a horizontal direction and the count total being along a graph of the image in a vertical direction.

9. A system, comprising:
    a means for forming an image, wherein the image is a waveform;
    a means for determining discrete points of the image;
    a means for forming count totals of the number of discrete points of the image in a sweep of the discrete points in a first direction; and
    a means for determining a statistical value according to the count totals of the discrete points, the means for determining the statistical value including a first value according to the number of count totals above and below a maximum value of the waveform, and summarizing the count-totals to determine a second value.

10. The system of claim 9, wherein each vertical position of a graph of the image having a count total.

11. The system of claim 9, wherein the sweep in the first direction being in a horizontal direction and the count total being along a graph of the image in a vertical direction.

12. The system of claim 9, further comprised of a second direction being a vertical column having the count totals for each row of data points of the waveform.

13. A system, comprising:
    a means for forming an image;
    a means for determining discrete points of the image;
    a means for forming count totals of the number of discrete points of the image in a sweep of the discrete points in a first direction;
    a means for determining a statistical value according to the count totals of the discrete points; and
    a means for determining a product of the count-totals for each vertical position of the image by the value of vertical position of the image, where at one end of the vertical position being a first value and the other end of the vertical position being a second value.

14. The system of claim 13, wherein the product being a total energy of the image.

15. The system of claim 13, wherein each vertical position of a graph of the image having a count total.

16. The system of claim 13, wherein the sweep in the first direction being in a horizontal direction and the count total being along a graph of the image in a vertical direction.

17. A system, comprising:
    a display for forming an image of a waveform;
    a memory including computer executable instructions for forming the waveform and analyzing the waveform; and
    a processor connected to the memory for instructing a determination of discrete points of the waveform on the display, forming count totals of the number of discrete points of the waveform in a sweep of the discrete points in a first direction, and determining a value for the analysis of the waveform according to the count totals of the discrete points, the value comprising a first value according to the number of count totals above and below a maximum value of the waveform, and a second value of sum of the count-totals.

18. The system of claim 17, wherein the sweep in the first direction being in a horizontal direction and the count total being along a display of the waveform in a vertical direction.

19. The system of claim 17, further comprised of a second direction being a vertical column having the count totals for each row of data points of the waveform.

20. The system of claim 17, wherein the processor determines a product of the count-totals for each vertical position of the waveform by the value of vertical position of the waveform, where at one end of the vertical position being a first value and the other end of the vertical position being a second value.

* * * * *